Dec. 2, 1952  N. C. BEESE ET AL  2,620,453
PROTECTIVE DEVICE
Filed May 7, 1948
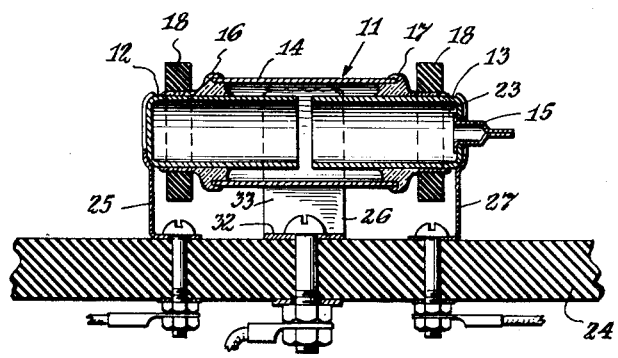
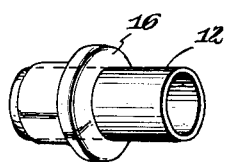
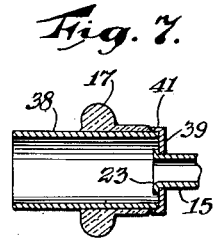
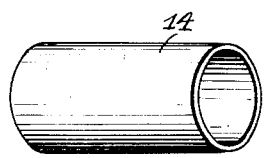
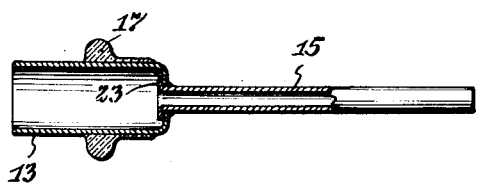
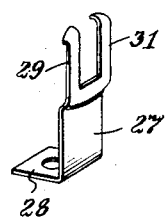
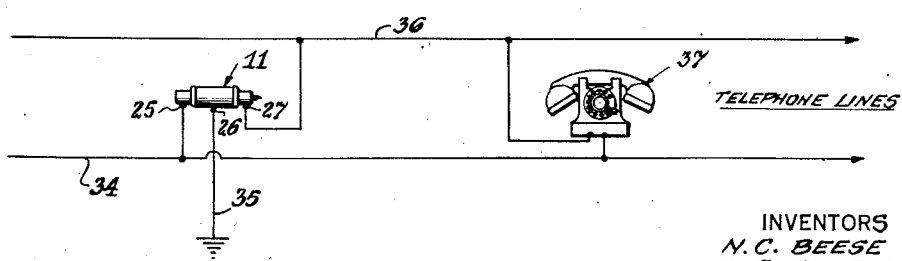
INVENTORS
N. C. BEESE
D. S. GUSTIN
ATTORNEY Patented Dec. 2, 1952

2,620,453

UNITED STATES PATENT OFFICE 2,620,453

PROTECTIVE DEVICE

Norman C. Beese, Verona, and Daniel S. Gustin, Bloomfield, N. J., assignors to Westinghouse Electric Corporation, East Pittsburgh, Pa., a corporation of Pennsylvania Application May 7, 1948, Serial No. 25,556

11 Claims. (Cl. 313—185)

This invention relates to protective devices, and more particularly to such formed as discharge tubes having three electrodes, one of which may be grounded, and the other two respectively connected to lines of a circuit to be protected.

The principal object of our invention, generally considered, is to provide a discharge device which has a relatively low break-down voltage, is a compact unit of rugged mechanical structure, with electrodes in the form of coaxial and telescoping metal cylinders, and which is especially adapted for protection of telephone lines from electrostatic charges which may be induced by lightning or other cause.

Another object of our invention is to provide a gas discharge device adapted to protect telephone lines, formed as small as possible to allow for fitting in a convenient space, comprising metal shells sealed together by glass of corresponding coefficient of expansion, and desirably containing an ionizing medium allowing for low break-down voltage between the parts of the envelope, which parts perform the additional function of electrodes.

Other objects and advantages of the invention will become apparent as the description proceeds.

Referring to the scale drawing:

Figure 1 is an axial sectional view of a protective device embodying our invention, after gas-filling and tipping off.

Figure 2 is a perspective view of one of the electrodes and envelope portions of a preferred form of device.

Figure 3 is a perspective view of the larger-diameter or intermediate electrode of such a device.

Figure 4 is an axial sectional view of the other end electrode, after putting on the glass used for sealing it to the intermediate electrode.

Figure 5 is a perspective view of one of the clips which may serve for making contact with one of the end electrodes of the device.

Figure 6 is a wiring diagram illustrating how our device may be employed in practice.

Figure 7 is a fragmentary sectional view corresponding with a portion of Figure 1, but showing a modification.

Closely spaced carbon blocks have been used as lightning arrestors to protect communication equipment. The inherent defect in such units is that, with repeated surge discharges, the carbon builds up into small conical points where the discharges occur. This causes the electrodes to "short" and render the communication line inoperative. In places like Australia where lightning is very prevalent, such block protectors are useless because their useful life is too short.

It has, therefore, been found desirable and is customary to protect certain circuits, and especially telephone lines and the personnel using such equipment, from high electrical charges which may develop thereon in service, especially in certain parts of the world, notably the northern part of Australia, the tropics, and in regions where sand or snow driven by high winds induces such charges, with a protective device in the form of a glow lamp.

A compact unit having suitable electrical characteristics and a rugged mechanical structure has been developed by us, as an improvement over such structures in which the outer envelope is formed of glass, thereby not only making the device more rugged, but making it unnecessary to occupy more than a very small space. A preferred embodiment, of our invention which will now be described, is formed by parts which perform the double purpose of composing the envelope of the device and at the same time function as electrodes thereof.

Referring to the drawing in detail, which illustrates one embodiment of our invention, like parts being designated by like reference characters, there is shown a protective device 11 comprising coaxially disposed electrodes 12, 13, and 14. The pair of electrodes, 12 and 13, are desirably of about the same size, that is, of corresponding diameter and length as well as thickness of material, except that one of said electrodes has a metal or glass exhaust tube 15 extending from its outer end thereof.

All of said electrodes are desirably formed of metal which has a coefficient of expansion adapting it to seal satisfactorily to glass which is conveniently employed for uniting the parts. Said electrodes may therefore be formed of sheet nickel, "Kovar," or some other alloy having the characteristics specified. "Kovar" is a special nickel-cobalt-iron alloy, the composition of which is disclosed in the Lempert et al. Patent No. 2,279,831, dated April 14, 1942. If "Kovar" is used, the parts after assembly may be sealed together by glass having a corresponding coefficient of expansion, an example being that manufactured by the Corning Glass Works and designated No. 7052 or No. 704.

In the embodiment illustrated in Figure 1, the ends of the outer or larger electrode 14, forming the body of the device, are sealed to intermediate portions of the end electrodes 12 and 13 by annular masses or beads 16 and 17 of such sealing glass which bridges the radial distance between said parts. Such glass is desirably not only disposed immediately between the outer edge portions of the electrode 14 of larger diameter and the outer intermediate surfaces of the end electrodes 12 and 13, but is desirably extended over the edges of said outer electrode 14, as well as continued outwardly to near but not beyond the outer ends of said electrodes 12 and 13 as illustrated. The protective device 11 when in use may have washers 18 of synthetic or natural rubber, "duprene," "neoprene," or the like, which minimize leakage along the outer surfaces of the glass 16 and 17, especially if such devices are to be used in countries which have very humid climates. The washers may be replaced by a silicone or other varnish that is more resistant to surface leakage in humid weather than a glass surface.

Although each of the end electrodes 12 and 13 may be formed as a one piece thimble-like element, as illustrated, it may be considered desirable to build them each up from an open-ended hollow cylinder 38, over one end of which is fitted a cap 39 having a relatively narrow encircling flange 41, as illustrated in Fig. 7, which is welded, brazed, or soldered thereto. These parts may be formed of relatively thin metal, say about .020" or .030" in thickness, and when assembled may be about 7/8" long and .44" in outside diameter. The electrode 14 may be formed of metal of similar thickness and is desirably about 1 1/8" long and .62" in outside diameter. The parts are assembled so that the adjacent ends of the electrodes 12 and 13 are spaced a distance at least as great, and preferably about the same, in this embodiment say about $\frac{3}{32}$", as the radial distance between the inner surface of the electrode 14 and the outer surface of the electrodes 12 and 13.

The exhaust tube 15 may be connected to its electrode, in this case that numbered 13, by slightly flanging the connected end, as indicated at 23, and either connecting it to the correspondingly-apertured end wall of the electrode, if the latter is formed in one piece, as most clearly shown in Figure 4, or to a correspondingly apertured cap portion, if so formed, as by welding, brazing, or soldering.

After assembly of the parts, the device 11 is exhausted and filled with an inert gas. While a mixture of 90 parts of krypton and 10 parts of xenon by volume, at a pressure of about 50 mm. of mercury, seems to be suitable, pure argon gas at a somewhat greater pressure, preferably between 70 and 80 mm. of mercury, is more satisfactory from a standpoint of cost. The characteristics of the device may be altered by changing the pressure of the gaseous filling. A small quantity of radium bromide, which need not be more than a few micrograms, may be as low as $\frac{5}{10}$ microgram, is desirably placed in each device to assure breakdown at about 1000 volts with steep wave front voltage surges increasing at 10 kilovolts per microsecond. It is considered permissible to eliminate the use of radium, although such appears desirable at the present time. After completion, the outer metal surface may be plated with a highly conductive metal, silver being an example, to improve its appearance and contact with mounting clips.

Tests of such devices filled with pure argon gas at various pressures, show that the surge breakdown voltage is nearly independent of gas pressure between 15 mm. and 150 mm. of mercury. However, at 60 cycles, breakdown was very dependent upon gas pressure. Variations in the diameter and length of the cylinders show that the surge breakdown voltage is dependent both upon the spacing of the electrodes and their surface areas. Thus, gas volume and electrode spacing affect the probability of effective gas ionization during the application of the surge voltage. The breakdown should occur in less than 1/5 microsecond, with a rate of voltage rise of 10,000 volts per microsecond. Spacing between electrodes is more critical than electrode length for a given outer cylinder diameter in determining surge breakdown. This is also true for 60 cycle alternating current breakdown voltage. It has, however, been found that polarity does not affect the breakdown voltage, but smaller spacing between electrodes produced lower voltage breakdown than larger spacing. Besides the gas volume and surface area of the electrodes, the corona of high field intensity at sharp edges would affect breakdown.

A device such as described may be mounted on a switchboard 24 or the like, as by means of clips 25, 26, and 27. The clips 25 and 27 are each desirably formed as shown in detail in Figure 5, that is, with a lower flange 28 for connection with the switchboard 24, or other supporting member, and an upstanding portion terminating in spaced fingers 29 and 31 which engage the bare end portions of the electrodes 12 or 13, and straddle the projecting stub portion of the exhaust tube 15 at the exhaust tube end of the device.

The intermediate contact clip 26 is desirably U-shaped and has a bottom portion 32 for connection with the switchboard 24, or other supporting element, and upstanding spring fingers 33 which embrace and grip the electrode portion 14 therebetween. Leads from said contact elements 25, 26, and 27 extend respectively to one transmission line 34 of a telephone or other circuit, a ground connection 35, and the other line 36 of said circuit, as shown most clearly in Figure 6. A telephone is indicated at 37.

The three electrode construction for protecting telephone lines and the like is preferable to two electrode tubes because the telephone wires will have a lower potential between them when an induced surge is cleared by such a device.

Although a preferred embodiment of our invention has been disclosed, it will be understood that modifications may be made within the spirit and scope of the appended claims. For example, the intermediate electrode 14 may be of smaller diameter than the end electrodes 12 and 13 and have its ends respectively received therein, leaving an exposed central or intermediate portion which may be grounded like the electrode 14. The adjacent ends of the end electrodes, in this case, would be connected by annular glass bodies to intermediate portions of the central electrode, or that of smaller diameter, but otherwise the construction would be substantially identical and the function would be the same.

As a further embodiment, the end electrodes 12 and 13 could be reversed, that is, have their closed ends inside of the intermediate electrode 14 and positioned adjacent thereto and open outwardly. In such a construction, the outer edges of the outer electrode could be connected to the outer edges of the inner electrode, or those of smaller diameter, by annular glass bodies as in the illustrated embodiment. As in the preceding embodiments the intermediate electrode could be grounded and the end electrodes suitably connected respectively to the lines to be protected.

We claim:

1. A protective device for electric circuits comprising an envelope formed of a pair of hollow cylindrical electrodes disposed coaxially, opening toward one another, of corresponding diameter and thickness of material, and spaced longitudinally to leave a gap therebetween, a third hollow cylindrical electrode of larger diameter telescoping with said pair and bridging said gap, the annular spaces between the end portions of said third electrode and the outer cylindrical surfaces of said pair of electrodes being bridged by glass sealing said electrodes together, completing, and making the envelope gas-tight, and an inert gas at reduced pressure enclosed in said envelope.

2. A protective device for electric circuits comprising an envelope formed of a pair of hollow cylindrical metal electrodes disposed coaxially and spaced longitudinally to leave a gap therebetween, a third hollow cylindrical metal electrode of larger diameter telescoping with said pair and bridging said gap, the width of said gap approximating the difference between their radius and that of said third electrode, said third electrode being disposed coaxial with said pair of electrodes and approximately centered longitudinally thereover, the annular spaces between the end portions of said third electrode and the outer cylindrical surfaces of said pair of electrodes being bridged by glass, having a coefficient of expansion corresponding with that of the metal forming said electrodes, sealing said electrodes together, completing, and making the envelope gas-tight, and an inert gas at reduced pressure enclosed in said envelope.

3. A protective device for electric circuits comprising an envelope formed of a pair of cylindrical electrodes disposed coaxially, spaced longitudinally to leave a gap therebetween, and formed of an alloy of nickel, cobalt and iron, a hollow cylindrical electrode formed of the same alloy, of larger diameter, telescoping with said pair, axially centered with respect thereto, and bridging said gap, the annular spaces between the end portions of said hollow electrode and the outer cylindrical surfaces of said pair of electrodes being bridged by glass of expansion corresponding with that of Corning No. 7052 glass, so as to agree with the expansion of said electrodes, sealing the same together, completing, and making the envelope gas-tight, and an inert gas at reduced pressure enclosed in said envelope.

4. A protective device for electric circuits comprising an envelope formed of a pair of hollow cylindrical end electrodes disposed coaxially and spaced longitudinally to leave a gap therebetween, a third hollow cylindrical electrode of larger diameter telescoping with said pair and bridging said gap, the annular spaces between the end portions of said electrodes being bridged by glass sealing said electrodes together, completing, and making the envelope gas-tight, said glass being extended axially over the outer surface of said third electrode from the edges toward the center, and over the outer surfaces of the end electrodes toward the ends, and means, such as rubber washers tightly fitted on said extended glass on said end electrodes, to minimize glass surface leakage between said end and third electrodes.

5. A protective device for electric circuits comprising an envelope formed of a pair of hollow cylindrical electrodes disposed coaxially and spaced longitudinally to leave a gap therebetween, each electrode comprising a hollow open-ended cylinder, the outer end of which is closed by a cap formed of similar material, having a flange receiving the end portion thereof, and secured thereto in a gas-tight manner, a third hollow cylindrical electrode of larger diameter telescoping with said pair and bridging said gap, the annular spaces between the end portions of said third and said pair of electrodes being bridged by glass of appropriate expansion characteristics, sealing, said electrodes together, completing, and making the envelope gas-tight, and inert gas at reduced pressure enclosed in said envelope.

6. A protective device for electric circuits comprising an envelope formed of a pair of hollow cylindrical electrodes disposed coaxially, and spaced longitudinally to leave a gap therebetween a third hollow cylindrical electrode of larger diameter telescoping with said pair, and bridging said gap, the annular spaces between the end portions of said third electrode and the outer cylindrical surfaces of said pair of electrodes being bridged by glass sealing said electrodes together, completing, and making the envelope gas-tight, and a mixture of about 90 parts krypton and 10 parts xenon by volume at a pressure of about 50 mm. of mercury enclosed in said envelope.

7. A protective device for electric circuits comprising an envelope formed of a pair of hollow cylindrical electrodes disposed coaxially and spaced longitudinally to leave a gap therebetween, each electrode being formed of metal about ½ mm. in thickness, about ⅞″ long axially, and about .44″ in outside diameter, a third hollow cylindrical electrode of corresponding metal with an outside diameter of about .62″ and about 1⅛″ long, bridging said gap, said gap being about 3/32″ wide, the annular spaces between the end portions of said third electrode and the outer cylindrical surfaces of said pair of electrodes being bridged by glass, sealing said electrodes together, completing, and making the envelope gas-tight, and argon at a pressure of between about 15 mm. and 150 mm. of mercury enclosed in said envelope.

8. In combination with a protective device for electric circuits comprising an envelope formed of a pair of hollow cylindrical electrodes disposed coaxially and spaced longitudinally to leave a gap therebetween, a third hollow cylindrical electrode of larger diameter telescoping with said pair and bridging said gap, the annular spaces between the end portions of said third electrode and the outer cylindrical surfaces of said pair of electrodes being bridged by glass, sealing said electrodes together, completing, and making the envelope gas-tight, an inert gas at reduced pressure enclosed in said envelope, and means mounting said device on a switchboard comprising a clip, arms of which extend into embracing engagement with said third electrode and contact devices extending from said switchboard on opposite sides of said clip and respectively engaging one of said pair of electrodes, a connection between said clip and ground, and a connection from each of said contact devices to a transmission line to be protected.

9. In combination with a protective device for electric circuits comprising an envelope formed of a pair of hollow cylindrical electrodes disposed coaxially and spaced longitudinally to leave a gap therebetween, and a third hollow cylindrical electrode of larger diameter telescoping with said pair and bridging said gap, the annular spaces between the ends of said third electrode and the outer cylindrical surfaces of said pair of electrodes being bridged by glass sealing said electrodes together, completing, and making the envelope gas-tight, and an inert gas at reduced pressure enclosed in said envelope, a connection between said third electrode and ground, means mounting said device comprising a clip, arms of which grip said third electrode, and contact devices respectively engaging one of said pair of electrodes.

10. A protective device for electric circuits comprising an envelope formed of a pair of hollow cylindrical electrodes disposed coaxially and spaced longitudinally to leave a gap therebetween, a third hollow cylindrical electrode telescoping with said pair and bridging said gap, the annular spaces between the end portions of at least one of said electrodes and the circumscribed portions of the remainder of said electrodes being bridged by glass beads disposed entirely between the ends of the device and sealing said electrodes together, completing, and making the envelope gas-tight, and in inert gas at reduced pressure enclosed in said envelope.

11. A protective device for electric circuits comprising an envelope formed of a pair of cylindrical electrodes of corresponding diameter and length disposed coaxially and spaced longitudinally to leave a gap therebetween, a hollow cylindrical electrode of larger diameter telescoping with said pair and bridging said gap, and glass bridging the annular spaces between the end portions of said hollow electrode and the outer cylindrical surfaces of said pair of electrodes, sealing said electrodes together in gas-tight relationship, and an inert gas at reduced pressure enclosed in said envelope.

NORMAN C. BEESE.
DANIEL S. GUSTIN.

REFERENCES CITED

The following references are of record in the file of this patent:

UNITED STATES PATENTS

| Number | Name | Date |
|---|---|---|
| 1,104,961 | Chapman et al. | July 28, 1914 |
| 1,144,029 | Creighton | June 22, 1915 |
| 1,874,407 | Young | Aug. 30, 1932 |
| 1,922,047 | Hund | Aug. 15, 1933 |
| 1,949,347 | Bouwers | Feb. 27, 1934 |
| 1,965,584 | Foulke | July 10, 1934 |
| 1,995,737 | Everett | Mar. 26, 1935 |
| 2,279,831 | Lempert | Apr. 14, 1942 |
| 2,305,096 | McDermott | Dec. 15, 1942 |
| 2,402,600 | Chevigny et al. | June 25, 1946 |
| 2,414,622 | Watrous | Jan. 21, 1947 |
| 2,456,855 | Arnott et al. | Dec. 21, 1948 |